(12) United States Patent
Zhang et al.

(10) Patent No.: US 9,319,514 B1
(45) Date of Patent: *Apr. 19, 2016

(54) DYNAMIC PROVISIONING OF A SWITCH WITH CUSTOM RINGBACK MEDIA

(71) Applicant: Sprint Spectrum L.P., Overland Park, KS (US)

(72) Inventors: Baoquan Zhang, Overland Park, KS (US); Tong Zhou, Lower Gwynedd, PA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/849,189

(22) Filed: Sep. 9, 2015

Related U.S. Application Data

(63) Continuation of application No. 11/378,442, filed on Mar. 16, 2006, now Pat. No. 9,160,845.

(51) Int. Cl.
*H04M 3/42* (2006.01)
*H04W 4/16* (2009.01)

(52) U.S. Cl.
CPC ...... *H04M 3/42017* (2013.01); *H04M 3/42153* (2013.01); *H04W 4/16* (2013.01)

(58) Field of Classification Search
CPC ... H04M 3/4285; H04M 3/428; H04M 3/436; H04M 3/42153; H04M 3/42; H04M 2203/2011
USPC ............................ 379/201.01, 201.12, 215.01
See application file for complete search history.

(56) References Cited

U.S. PATENT DOCUMENTS

| 7,006,608 B2 | 2/2006 | Seelig et al. |
| 7,512,421 B2 | 3/2009 | Kim et al. |
| 7,613,287 B1 | 11/2009 | Stifelman et al. |
| 2002/0024957 A1 | 2/2002 | Azuma et al. |
| 2002/0183048 A1 | 12/2002 | Takeuchi |
| 2003/0002657 A1 | 1/2003 | Seelig et al. |
| 2003/0086558 A1 | 5/2003 | Seelig et al. |
| 2004/0001518 A1 | 1/2004 | Gilbert et al. |
| 2004/0081304 A1 | 4/2004 | Lee |
| 2005/0105706 A1 | 5/2005 | Kokkinen |
| 2005/0129029 A1 | 6/2005 | Creamer et al. |
| 2005/0152345 A1 | 7/2005 | Bog et al. |
| 2005/0185918 A1 | 8/2005 | Lowe |

OTHER PUBLICATIONS

Rahul Chauhan, "A Walk through to IS-95A, IS-95B, CDMA-2000 and Call Processing," Version 2 (Jun. 20, 2003).
G. Camarillo et al., "Early Media and Ringback Tone Generation in the Session Initiation Protocol," Internet Engineering Task Force, Internet Draft (Feb. 10, 2003).

*Primary Examiner* — Rasha Al Aubaidi

(57) ABSTRACT

A node in a telephone network such as a switch stores associations between called and calling parties and colored ringback media played by the called party. Later, when the same calling party calls the called party, the node retrieves the stored ringback media and forwards the media to the calling party on behalf of the called party. In one embodiment, the node comprises a switch. In other embodiments, the node is a central server caching called/calling party combinations and associated ringback media and provides the ringback media forwarding function for a distributed population of called parties. Such called parties may comprise wireless phones.

16 Claims, 4 Drawing Sheets

DYNAMIC PROVISIONING OF A SWITCH WITH CUSTOM RINGBACK MEDIA

BACKGROUND

A. Field

The invention relates to providing "ringback" media, e.g., tones, music, speech or other media, to a caller's phone. Ringback is the ringing or other sound that a caller hears while waiting for the called party to answer the phone.

B. Related Art

In traditional phone systems, a switch in telephone network plays a ringback tone to the calling party. The switch may be at caller's end of the call or at the called party's end of the call. More recently developments have given rise to a concept sometimes known as "colored ringback." With colored ringback, a non-conventional ringback is provided to the caller. The ringback media could be a celebrity voice saying something like "Hold on a sec . . . ", or some specified music or the like. The way colored ringback service works (as an example) is that the originating switch (serving the calling party) or terminating switch (serving the called party) may, with possible assistance from an intelligent network (AIN) node such as a service control point (SCP) or the like, determine that the called party (or perhaps the calling party) subscribes to the colored ringback service. The switch may then actually connect the caller with a service node or other platform that will play the colored ringback to the caller, while the switch tries to connect the call through to the called party. Once the called party answers, the switch will then connect the call to the called party, disconnecting the call from the colored ringback platform. Colored ringback tones could be defined/selected based on the identity of the caller and/or called party.

Instead of having a switch or other network infrastructure provide colored ringback service, U.S. patent application publication 2004/0081304 contemplates having the called device itself provide the colored ringback service. Once the called party answers the call (goes off-hook), the called device would then stop playing the colored ringback and allow the call to proceed.

Further art of interest includes Bog et al., US Patent application publication 2005/0152345; Takeuchi, U.S. Patent application publication 2002/0183048; Gilbert et al., U.S. Patent application publication 2004/001518; Azuma et al., US Patent application publication 2002/0024957; and Lowe, US Patent application publication 2005/0185918.

Playing a ringback tone from the called party directly (as mentioned in 2004/0081304) has several drawbacks, particularly so when the called party is a cellular telephone. First, there is utilization of network resources at the terminating side of the network (i.e., resources such as channel elements, traffic channels, and other resources involved in communicating with the called party). Conservation of such resources is desirable. Second, a longer delay at the terminating side due to setting up and transmitting ringback tones from the called party degrades the caller's user experience. The terminating network has to page the mobile unit and set up a traffic channel. The delay ranges typically from 2 to over 5 seconds. Paging retries may occur as well. Thirdly, the technique keeps the terminating phone busy, and uses the limited computing resources at the terminating phone.

There is a need in the art for a method and system by which the calling party can use ringback media features that are customized for particular calling parties, but which reduces having to generate such ringback media at the called device and avoids the above-mentioned drawbacks.

SUMMARY

When a device receives an incoming call, the device would apply logic to (i) begin ringing so the called user will know the call is arriving, and (ii) begin playing some colored ringback retrieved from the called device's data storage. Once the called user answers the call, the called device would then stop playing the colored ringback and allow the call to proceed.

In addition, a switch (or in theory some other network entity) in the call path will (i) detect and record the ringback played by the called device, and (ii) record the fact that the particular ringback was played when caller "A" called a called party "B". In turn, the next time that caller "A" calls that called party "B", the switch will itself play out that recorded ringback tone, without the need to first connect the call through to the called device.

Further, in an exemplary embodiment, the ringback that the switch stores could be set to expire after a certain period of time, after which, when that caller "A" calls that called party, the call would be connected through to the called device "B" for ringback playout. In other words, the switch could effectively cache the ringback tone for a limited time and after this time has expired allows the called party to play the ringback and records the ringback tone and A/B association again for later use.

In one embodiment the invention is implemented in a cellular telephony network. In particular, a service control point (SCP) will direct a mobile switching center (MSC) to apply the inventive service (recording the ringback and the association A and B and later detecting a new call from A to B). In response, if the MSC has the recorded ringback media for the caller/callee combination, then the MSC will play the ringback tones for caller A while setting up the call to the called device B. However, if the MSC does not have media for the caller/callee (A/B) combination, then the MSC will let the call connect to the called device B, and let the called device B play the ringback media.

Various methods may be used to determine whether a called device "B" will know in a given instance whether to play back for a calling party ringback media, or whether to not play such ringback media under the assumption that the network is doing so on its behalf. For example, an entity in the telephony network can include a special parameter in a page message it sends to the called device, as an indication of whether or not the device should answer and play locally stored ringback media.

In another aspect, a method is provided of handling ringback media in a switch connecting a call from a calling party to a called party. The method comprising the steps of a) determining whether ringback media for the association of the calling party and the called party is currently stored; and b) if the determining of step a) is affirmative, retrieving the ringback media and transmitting the ringback media to the calling party. In a still further aspect, an improved telephone switch is provided. The switch provides switching functions for connecting a call from a calling party to a called party. The improvement comprises storing ringback media in a memory accessible to the switch and an association between calling party and called party for the ringback media; and providing instructions in the switch for retrieving the ringback media and transmitting the ringback media to the calling party in the event that the called party calls the calling party and the call is routed through the switch.

DETAILED DESCRIPTION OF PREFERRED EMBODIMENT

Figure 1:
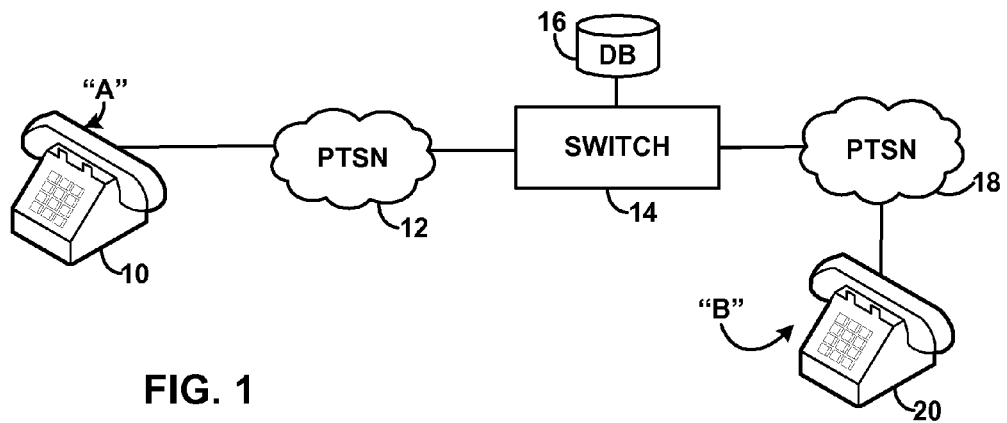
FIG. 1 is a schematic illustration of two telephones and a telephony network. Calling party using telephone "A" calls a called party using telephone "B". B plays ringback tones to A. Ringback media is detected and stored in a database accessible to a switch, and in the future when A calls B the switch retrieves the ringback media and plays it for A.

FIG. 1 is a schematic illustration of two telephones 10 and 20 and a telephony network including public switched telephone network components 12 and 16 connected via a circuit switch 14. Circuit switch 14 is connected to a database 16 which stores ringback media. Calling party using telephone "A" (10) places a call to a called party using telephone "B" (20), and the call is connected via switch 14. Phone B includes a memory storing ringback media, a processor and logic for execution by the processor (not shown, but conventional).

One embodiment of this invention includes a method of playing ringback tones to a calling party A, comprising the steps of:

a) directing an incoming call to a phone B associated with a called party;

b) receiving ringback media from the phone B in a node 14 in a telephony network for delivery to the calling party A;

c) storing the ringback media in the node 14 in the telephony network and the association of the calling party A and the called party B; and d) subsequently transmitting the ringback media stored in the network node 14 to the calling party A in the event that the calling party later calls the called party B.

In step a), when the call comes into phone B, phone B applies logic stored in the phone to (i) begin ringing, so the called user will know the call is arriving, and (ii) begin playing colored ringback media retrieved from the called device B's data storage. The ringback media is forwarded by the telephone network to A. Once the called user answers the call, the called device B would then stop playing the colored ringback and allow the call to proceed in the normal fashion.

In step b) and c), the ringback media played by phone B is detected by the switch 14 and stored in a database 16 accessible to a switch. In particular, the switch 14 (or in theory some other network entity, see e.g., FIG. 4 below)) in the call path will (i) detect and record the ringback played by the called device B and store it in the database 16, and (ii) record an association between A and B and the ringback media, basically indicating the fact that the particular ringback was played when caller "A" called a called party "B".

In step d), in the future, when A calls B, the switch 14 retrieves the ringback media and plays it for A. That is, the next time that caller "A" calls that called party "B", the switch 14 will itself forward that recorded ringback media to A, without the need to first connect the call through to the called device B. Device B does not have to play the ringback media for A since it is being forwarded to A by the switch 14.

Figure 2:
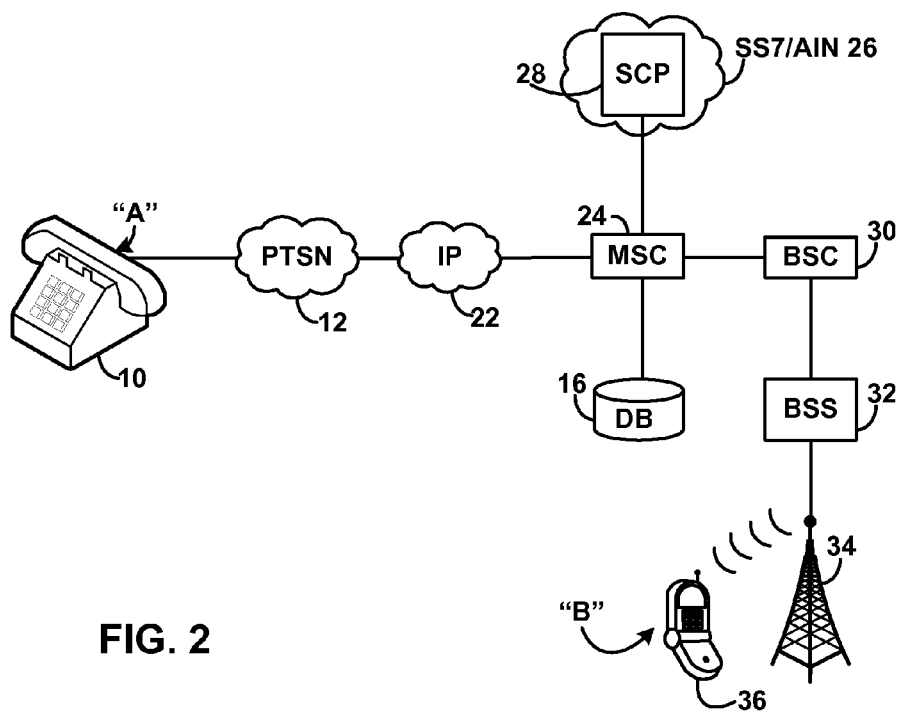
FIG. 2 is a schematic illustration of a second telephony network in which B is a mobile phone. The switching element playing ringback media in this example could be a mobile switching center (MSC) or a switch in the PSTN.

FIG. 2 is a schematic illustration of a second telephony network in which B is a mobile phone. Calling party using phone 10 ("A") dials the called party "B" (using mobile phone 36) via the PSTN 12, network 22 (which may consist of wireless service provider backbone network), and the call is routed to a mobile switching center 24 currently serving the phone 36. The wireless network infrastructure includes a base station controller 30 and a base station system 32 including associated antenna 34 for communicating over an air interface with the mobile phone B. These entities are conventional. When the call comes through to the MSC 24, the MSC can consult an advanced intelligent network (such as a Signaling system 7 network) 26 and determine that the phone 36 is a subscriber to a colored ringback media service. Such determination may be made for example by querying a service control point (SCP) 28 in the network 26 with phone 36 identification information (such as the phone number or serial number of the device 36) and receiving a response message indicating that phone 36 subscribes to the ringback service.

When the call comes through the switch 24, the switch determines whether there is an association between A (10) and B (36) and colored ringback media for such association in the database 16. If not, a channel is established to B (36) and B plays ringback media to A and the media is detected at the switch 24 and stored in the database 16. If there is such association, the switch 24 retrieves the ringback media from the database and returns it to A (10) on behalf of B (36). Switch 24 sends a parameter in a page message to B indicating that it has transmitted ringback media to the calling party (A), thus alerting B that it does not have to generate and transmit ringback media for A.

While in the example of FIG. 2, the switching element forwarding ringback media to A is the mobile switching center (MSC 24), in an alternative embodiment the ringback media could be forwarded by another switching entity in the wireless backbone network 22 or a switch in the PSTN 12.

Note further that while FIGS. 1 and 2 show phone A as being a conventional landline phone, this is not necessary and A could be a wireless phone (e.g., cellular telephone).

Figure 3:
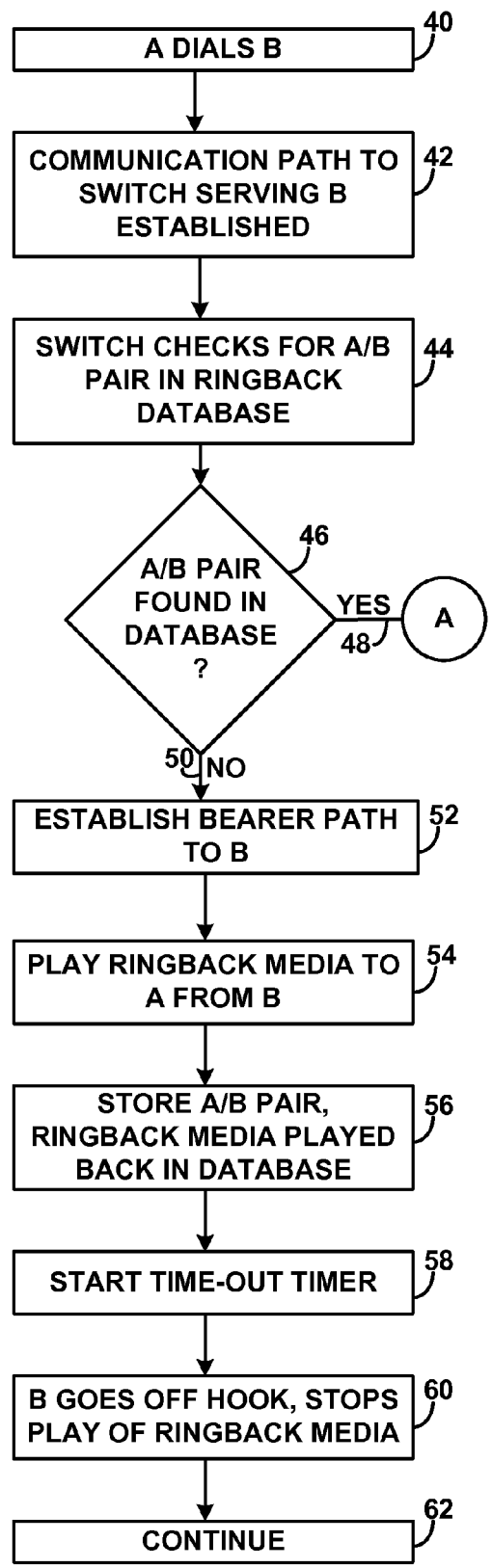
FIGS. 3 and 3A are a flow chart showing the operation of a preferred embodiment.
Figure 3A:
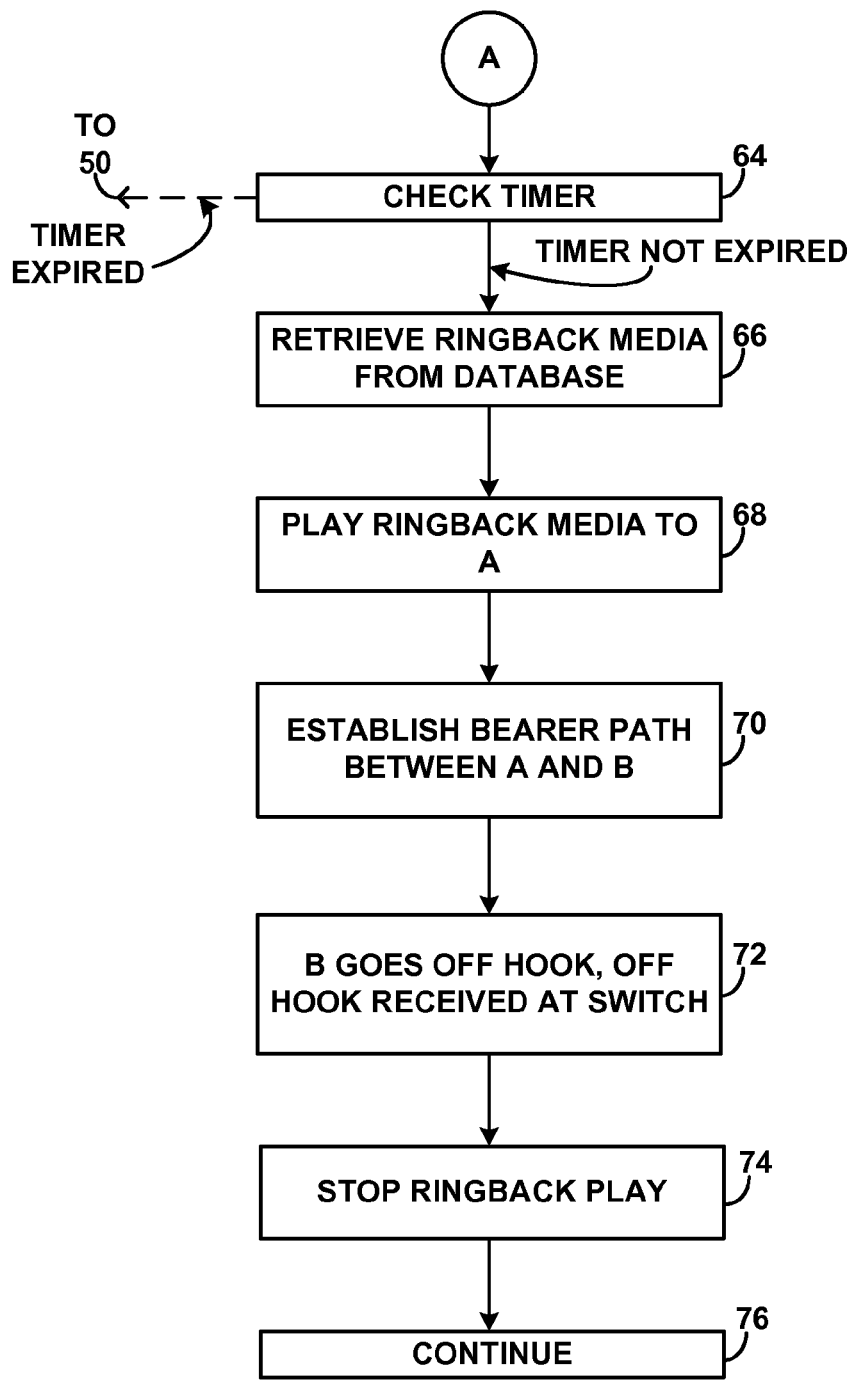

FIGS. 3 and 3A are a flow chart showing the operation of a preferred embodiment.

At step 40, phone A (10) goes off hook and the user of the phone A dials B.

At step 42, a communication path between A and a circuit switch serving the called party B is set up.

At step 44, the switch checks to see if ringback media is stored for the calling/called party combination A and B. This step may be accomplished for example by consulting the database 16 of FIGS. 1 and 2.

At step 46, a determination is made if ringback media for the A/B pair is found in the database. If no, the processing branch 50 is followed. At step 52, a bearer path to the called party B is established. Phone B starts ringing. At step 54, called phone B obtains ringback media from local memory and transmits the ringback media to the telephone network for transmission to A. At step 56, the switch detects the ringback media, forwards it to A, and stores the A/B association and the ringback media in the local database. At step 58 a time-out timer is started. Basically, the idea here is that the switch caches the ringback media for a limited period of time, and at the expiration of the time out period the ringback media and A/B association is deleted from memory. The amount of time is configurable. The duration may be say one week, one month or one year. Step 58 is optional. At step 60, the party using the called phone B answers the phone and it goes off-hook. Play of ringback tones by phone B ceases. At step 62, the call continues in the normal fashion and eventually A or B hang up.

Suppose at step 46 of FIG. 3 the A/B pair and ringback media is found in the local database. If so, processing proceeds to the yes branch 48 (see FIG. 3A). At step 64, the switch checks the timer to see if the A/B association has expired. This step could be considered part of step 46 and branch 48 only conducted if the timer is not expired. At step 66, the switch retrieves the ringback media from the database. At step 68, the switch forwards the ringback media to the calling party A. At step 70, a bearer path between A and B is established by the switch, and phone B starts to ring. The call set up messages to set up the call at phone B could include a message or parameter indicating that the switch is playing the ringback media to A on behalf of B. At step 72, the called party answers and phone B goes off-hook. The off-hook signal is received at the switch. In response, the switch stops the ringback play at step 74. A and B are connected through the switch (from step 70) and the call continues in the normal fashion (step 76).

It is possible that the user of the phone "B" may download new ringback media and may wish to start using it immediately, e.g., for the next time A calls B. In this situation, the switch will continue to store the "old" ringback media and use it as shown in FIG. 3A, step 68 unless it receives notice from the handset B that that the new ringback media needs to be used. One way to accomplish this is for the handset B to send a message (such as a SMS message) to the switch to time out the timer associated with the old ringback media, and flush the media that is cached at the switch database. That way, when step 64 is entered and the time is considered expired, the "No" branch 50 of FIG. 3 executes and the switch obtains the new ringback media as indicated in step 56 of FIG. 3. When the user downloads the new ringback media, the user could be presented with a prompt on their handset such as "do you want to use the new ringtone immediately?" and offered a choice to select "yes" or "no". When they select "yes", logic in the handset executes to generate notification message to the switch to time out the timer. Other mechanisms for notification of the switch of the new ringback media are also possible.

Figure 4:
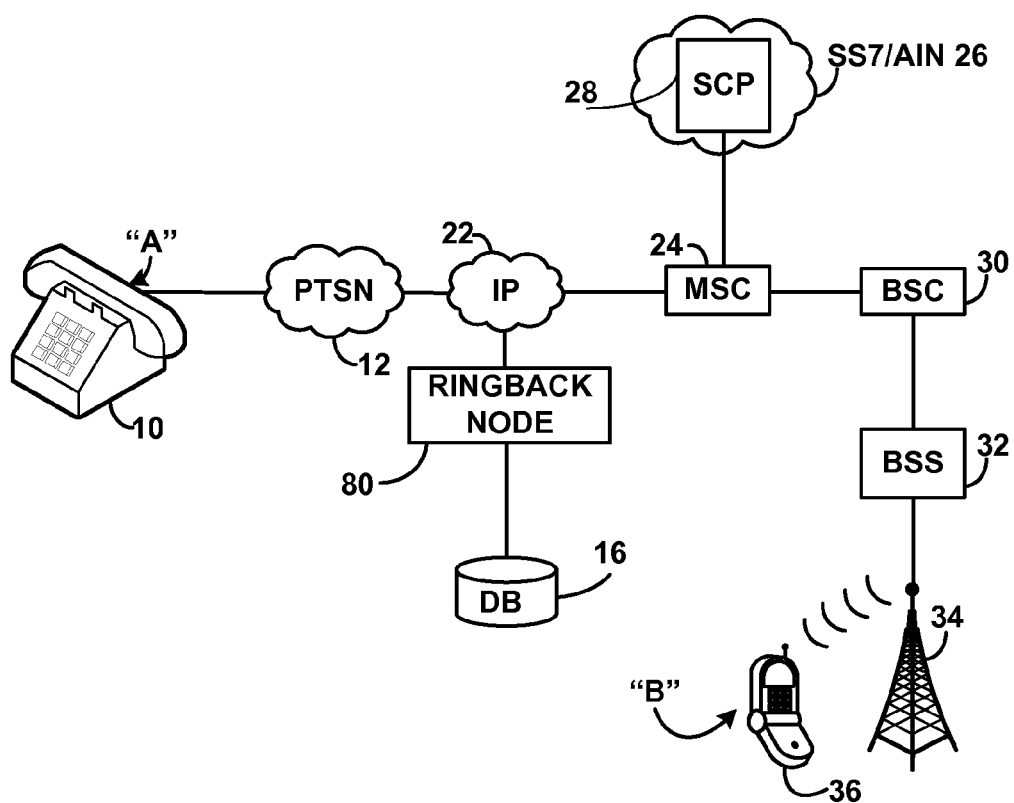
FIG. 4 is an illustration of an embodiment in which a ringback media is stored in a database accessible to a server functioning as a ringback node in an IP network connected to the telephony network, essentially off-loading the ringback forwarding functions from switching elements in the wireless or PSTN networks.

FIG. 4 is an illustration of an embodiment in which a ringback media is stored in a database 14 accessible to a server 80 functioning as a ringback node in an IP network 22 connected to the telephony network 24/30/32, which essentially off-loads the ringback functions from a switching element 24 in the wireless network or a switching function in the PSTN network 12. When the call from A to B is routed through the MSC 24, the MSC queries the SS7 network 26 to determine whether B subscribes to colored ringback media services. If so, MSC queries the node 80 to determine whether node 80 and attached database 16 stores ringback media for the A/B combination. If so, MSC instructs the node 80 to forward the stored ringback media for the A/B combination to the phone A. Meanwhile, MSC pages phone B (36) and establishes a bearer channel to B. When B answers, MSC sends a message to node 80 to stop forwarding ringback media to the phone A and the call between A and B proceeds in the normal fashion. If node 80 does not store ringback media for the A/B combination, when B is paged the page message includes a parameter indicating that B should play ringback media to A. MSC forwards the ringback media to the node 80 and the node 80 sets up an association in the database 16 containing the A/B pair and the played ringback media.

The advantage of the embodiment of FIG. 4 is that centralized storage of ringback media and called and calling party associations in the node 80 makes the ringback invention described herein suitable for roaming mobile phones, whereby the serving and terminating MSCs may not have locally stored called and calling party associations and ringback media due to the mobility of the phones. Such associations and ringback media are centrally maintained and available regardless of the location of A and B, and regardless of which switch happens to be handling the call either on behalf of A or on behalf of B.

The concept of expiration of a timer when a new ringback media is downloaded to the handset for immediate use applies to the embodiment of FIG. 4. For example, the node 80 may have a timer associated with each stored combination of calling and called party and associated ringback media. When a handset downloads new ringback media that it wishes to use immediately, the handset sends a message to the node 80 to expire the timer. The node includes logic for expiring the timer upon receipt of the notification message. Then, the new ringback media is played from the handset, detected in the MSC and forwarded to the node 80 for later use.

As noted above, various methods may be used to determine whether a called device "B" will know in a given instance whether to play back for a calling party locally stored ringback media, or whether to not play such ringback media under the assumption that the network (e.g., MSC) is doing so on its behalf. For example, an entity in the telephony network can include a special parameter in a page message it sends to the called device, as an indication of whether or not the device should answer and play a ringback tone. Other methods are of course possible.

From the foregoing discussion, it will further be appreciated that a method is provided of handling ringback media in a switch connecting a call from a calling party to a called party. The method comprising the steps of a) determining whether ringback media for the association of the calling party and the called party is currently stored; and b) if the determining of step a) is affirmative, retrieving the ringback media and transmitting the ringback media to the calling party.

In a still further aspect, an improved telephone switch (e.g. PSTN circuit switch or MSC) is provided. The switch provides switching functions for connecting a call from a calling party to a called party. The improvement comprises storing ringback media in a memory accessible to the switch and an association between calling party and called party for the ringback media; and providing instructions in the switch for retrieving the ringback media and transmitting the ringback media to the calling party in the event that the called party calls the calling party and the call is routed through the switch.

While presently preferred and alternative embodiments have been described, variation from the illustrated embodiments is possible without departure from the scope of the invention. The scope is to be determined by reference to the appended claims.

We claim:

1. A method comprising:
   (a) during setup of a call from a calling party to a called party via a telephony network, the telephony network (i) receiving ringback media from the called party and forwarding the ringback media to the calling party and (ii) storing the received ringback media and an association between the ringback media and the calling and called parties; and
   (b) during setup of a subsequent call from the calling party to the called party, (i) a node in the telephony network determining, based at least in part on the stored association, that the ringback media should be played out to the calling party, and (ii) in response to the determining, retrieving the ringback media and playing out the ringback media to the calling party.

2. The method of claim 1, wherein the node comprises a switching element.

3. The method of claim 2, wherein the telephony network comprises a cellular telephony network and wherein the switching element comprises a mobile switching center.

4. The method of claim 1, wherein storing the ringback media comprises storing the ringback media for a limited period of time.

5. The method of claim 1, further comprising the telephony network receiving a timer expiration signal from the called party and responsively deleting the stored ringback media, whereby during setup of a subsequent call from the calling party to the called party, step (a) is repeated.

6. The method of claim 1, wherein storing the ringback media and the association comprises storing the ringback media and the association in the node or in a database accessible to the node.

7. The method of claim 1, wherein playing out the ringback media to the calling party comprises the node playing out the ringback media to the calling party.

8. The method of claim 1, further comprising the node sending, to the called party, a message indicating transmission of the ringback media from the node to the calling party.

9. A method comprising:
(a) during setup of a call from a calling party to a called party via a telephony network, the telephony network receiving ringback media from the called party and forwarding (i) to the calling party, the ringback media and (ii) to a ringback node, the ringback media, to enable the ringback node to store the ringback media and an association between the ringback media and the calling and called parties;
(b) the ringback node receiving the ringback media, and the ringback node storing the ringback media and setting up the association; and
(c) during setup of a subsequent call from the calling party to the called party, (i) a switching element in the telephony network determining, based at least in part on the stored association, that the ringback media should be played out to the calling party, and (ii) in response to the determining, the switching element causing the ringback node to retrieve the ringback media and to play out the ringback media to the calling party.

10. The method of claim 9, wherein the telephony network comprises a cellular telephony network, and wherein the switching element comprises a mobile switching center.

11. The method of claim 9, wherein storing the ringback media and setting up the association comprises storing the ringback media and the association in the ringback node or in a database accessible to the ringback node.

12. The method of claim 9, wherein storing the ringback media comprises storing the ringback media for a limited period of time.

13. The method of claim 9, further comprising the ringback node receiving a timer expiration signal from the called party and responsively deleting the stored ringback media, whereby during setup of a subsequent call from the calling party to the called party, steps (a) and (b) are repeated.

14. The method of claim 9, further comprising the ringback node sending, to the called party, a message indicating transmission of the ringback media from the ringback node to the calling party.

15. A system comprising:
a switching element in a telephony network for (a) during setup of a call from a calling party to a called party, (i) receiving ringback media from the called party and forwarding the ringback media to the calling party and (ii) storing the received ringback media and an association between the ringback media and the calling and called parties, and (b) during setup of a subsequent call from the calling party to the called party, (i) determining based at least in part on the stored association, that the ringback media should be played out to the calling party, and (ii) in response to the determining, retrieving the ringback media and playing out the ringback media to the calling party.

16. The system of claim 15, wherein the telephony network comprises a cellular telephony network, and wherein the switching element comprises a mobile switching center.

* * * * *